United States Patent
Amano

(10) Patent No.: US 11,516,373 B2
(45) Date of Patent: Nov. 29, 2022

(54) IMAGING APPARATUS

(71) Applicant: Panasonic Intellectual Property Management Co., Ltd., Osaka (JP)

(72) Inventor: Takuya Amano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/500,796

(22) Filed: Oct. 13, 2021

(65) Prior Publication Data

US 2022/0286593 A1   Sep. 8, 2022

(30) Foreign Application Priority Data

Mar. 3, 2021   (JP) .............................. JP2021-033747

(51) Int. Cl.
*H04N 5/225*   (2006.01)

(52) U.S. Cl.
CPC ....... *H04N 5/22521* (2018.08); *H04N 5/2254* (2013.01); *H04N 5/225251* (2018.08)

(58) Field of Classification Search
CPC ......... H04N 5/22521; H04N 5/225251; H04N 5/2254
See application file for complete search history.

(56) References Cited

U.S. PATENT DOCUMENTS

| | | | | |
|---|---|---|---|---|
| 2005/0024529 A1* | 2/2005 | Kurosawa | ............ | H04N 5/2253 257/E27.151 |
| 2014/0055671 A1* | 2/2014 | Kawamura | .......... | H04N 5/2253 348/374 |
| 2017/0214830 A1* | 7/2017 | Tang | ..................... | G03B 15/006 |
| 2018/0054542 A1* | 2/2018 | Petty | ....................... | G02B 7/008 |
| 2018/0278814 A1* | 9/2018 | Yamamoto | ............... | G02B 7/02 |
| 2019/0154949 A1* | 5/2019 | Hosoe | ..................... | G02B 7/028 |
| 2021/0022645 A1* | 1/2021 | Andreev | ................. | A61B 5/743 |
| 2021/0232024 A1* | 7/2021 | Endo | ..................... | G03B 17/14 |

FOREIGN PATENT DOCUMENTS

| | | |
|---|---|---|
| JP | 2008-219610 A | 9/2008 |
| JP | 2009-100374 A | 5/2009 |
| JP | 2009-141609 A | 6/2009 |
| JP | 2010-213000 A | 9/2010 |

* cited by examiner

*Primary Examiner* — Chiawei Chen
(74) *Attorney, Agent, or Firm* — Renner, Otto, Boisselle & Sklar, LLP

(57) ABSTRACT

An imaging apparatus includes: a lens attachment portion to which a lens is attached; an image sensor on which light transmitted through a lens attached to the lens attachment portion is incident; a heat transfer members configured to support the image sensor and to absorb heat of the image sensor; a main frame including a duct in which outside air flows and provided with a through hole through which a part of the heat transfer member passes; a fan arranged in the duct; a front frames configured to support the lens attachment portion and the heat transfer members and to be attached to the main frame; and a seal member configured to block a flow of outside air from inside the duct toward the image sensor through the through hole.

5 Claims, 7 Drawing Sheets

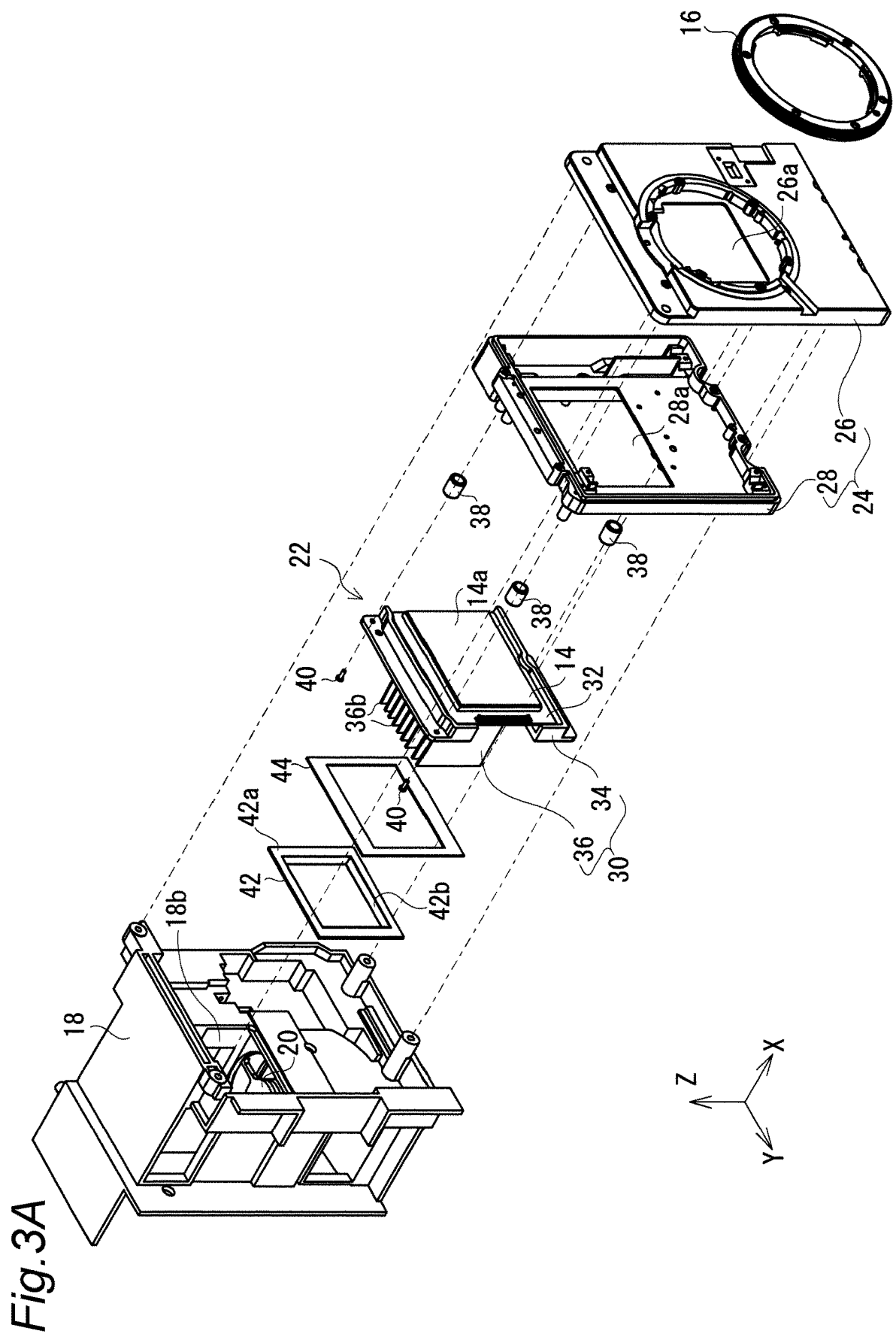

IMAGING APPARATUS

BACKGROUND OF THE INVENTION

Field of the Invention

The present disclosure relates to an imaging apparatus.

Description of the Related Art

For example, JA 2010-213000 A discloses an imaging apparatus that cools an image sensor using outside air. Specifically, the image sensor is cooled by a Peltier element (thermoelectric element). The heat absorbed by the Peltier element from the image sensor is transmitted to the heat sink including a plurality of fins. The plurality of fins of the heat sink are cooled by the outside air blown by the cooling fan.

SUMMARY OF THE INVENTION

Technical Problem

By the way, in a case where the image sensor is cooled using the outside air, it is necessary to take measures so that foreign matter such as dust included in the outside air does not reach the image sensor, particularly does not adhere to the light receiving surface of the image sensor. Adhesion of foreign matter such as dust to the light receiving surface may deteriorate the image quality of the captured image.

Thus, the present disclosure has an object to prevent foreign matter such as dust included in outside air from reaching an image sensor in an imaging apparatus that cools the image sensor using the outside air.

Means for Solving the Problems

In order to solve the above problem, according to one aspect of the present disclosure, provided is an imaging apparatus including: a lens attachment portion to which a lens is attached; an image sensor on which light transmitted through a lens attached to the lens attachment portion is incident; a heat transfer member configured to support the image sensor and to absorb heat of the image sensor; a main frame including a duct in which outside air flows and provided with a through hole through which a part of the heat transfer member passes; a fan arranged in the duct; a front frame configured to support the lens attachment portion and the heat transfer member and to be attached to the main frame; and a seal member configured to block a flow of outside air from inside the duct toward the image sensor through the through hole.

Effect of the Invention

According to the present disclosure, in the imaging apparatus that cools the image sensor using the outside air, it is possible to prevent the foreign matter such as dust included in the outside air from reaching the image sensor.

BRIEF DESCRIPTION OF THE DRAWINGS

FIG. 3A is an exploded perspective view of the subassembly shown in FIG. 2;

DESCRIPTION OF THE PREFERRED EMBODIMENTS

Hereinafter, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art.

It should be noted that the inventor(s) provides (provide) the accompanying drawings and the following description for a person skilled in the art to fully understand the present disclosure. Thus, the drawings and the description are not intended to limit the subject matter defined in the claims.

Hereinafter, an imaging apparatus according to an embodiment of the present disclosure will be described with reference to the drawings.

Figure 1:
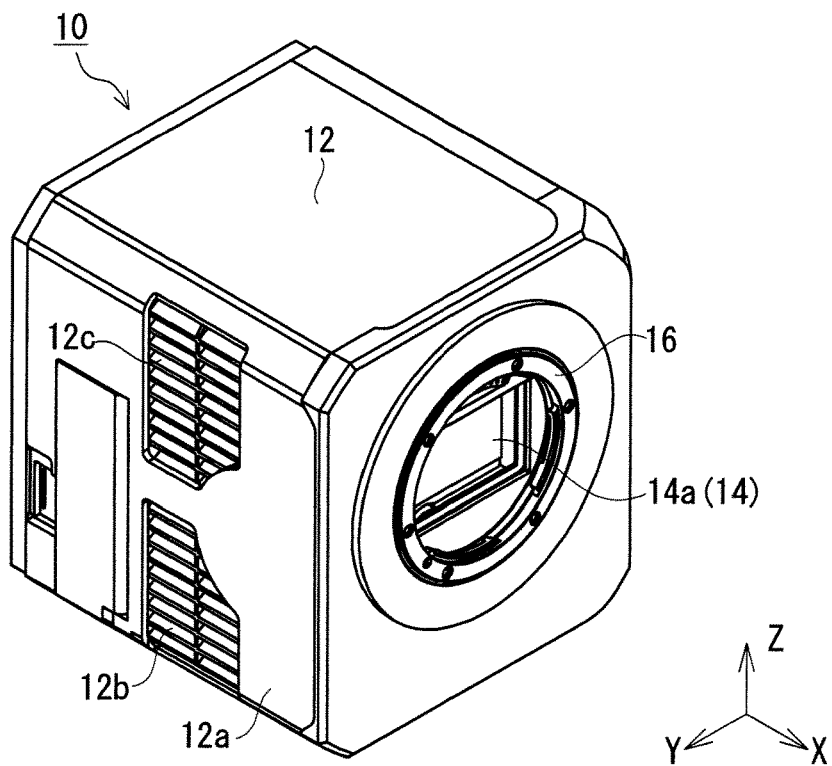
FIG. 1 is a perspective view of an imaging apparatus according to one embodiment of the present disclosure.
Figure 2:
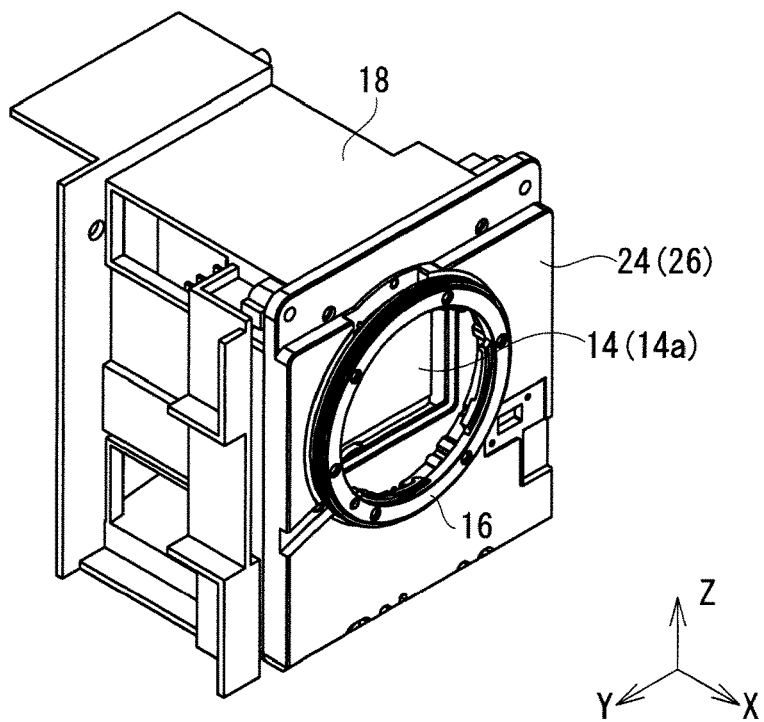
FIG. 2 is a perspective view of a subassembly of an imaging apparatus including components related to cooling of an image sensor.
Figure 3B:
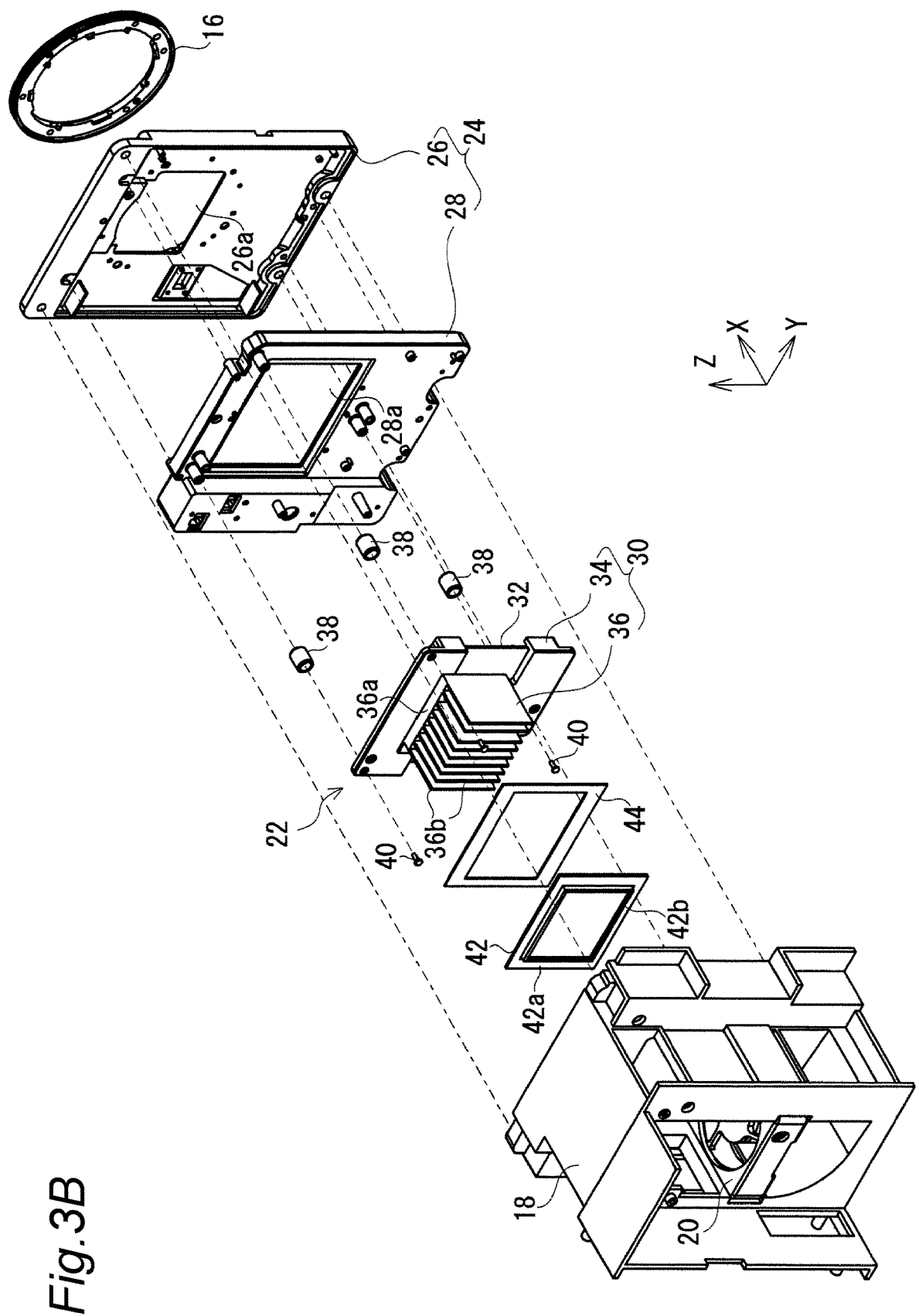
FIG. 3B is an exploded perspective view of the subassembly shown in FIG. 2 as viewed from a different direction.

FIG. 1 is a perspective view of an imaging apparatus according to an embodiment of the present disclosure. In addition, FIG. 2 is a perspective view of a subassembly of an imaging apparatus including components related to cooling of an image sensor. Furthermore, FIGS. 3A and 3B are exploded perspective views of the subassembly shown in FIG. 2 as viewed from different directions.

It should be noted that the X-Y-Z orthogonal coordinate system shown in the drawings is for facilitating understanding of the present disclosure, and does not limit the present disclosure. The X-axis direction indicates the front-rear direction of the imaging apparatus, the Y-axis direction indicates the left-right direction of the imaging apparatus, and the Z-axis direction indicates the height direction. In addition, in the present specification, a side on which the subject is present with respect to the imaging apparatus is referred to as a "front side", and a side on which the imaging apparatus is present with respect to the subject is referred to as a "rear side".

As shown in FIG. 1, in the case of the present embodiment, the imaging apparatus 10 includes a casing 12 having a substantially cubic shape and an image sensor 14 arranged inside the casing 12. The image sensor 14 is, for example, a CCD image sensor, a CMOS image sensor, or the like. Light (image of subject) transmitted through a lens (not shown) attached to the lens attachment portion 16 is incident on the light receiving surface 14a of the image sensor 14. The image sensor 14 outputs an electric signal corresponding to the incident image, that is, takes an image (take shoots a still image or a moving image).

As shown in FIG. 2, the imaging apparatus 10 also includes a main frame 18 arranged in the casing 12 and supporting the image sensor 14 and the lens attachment portion 16.

Figure 4:
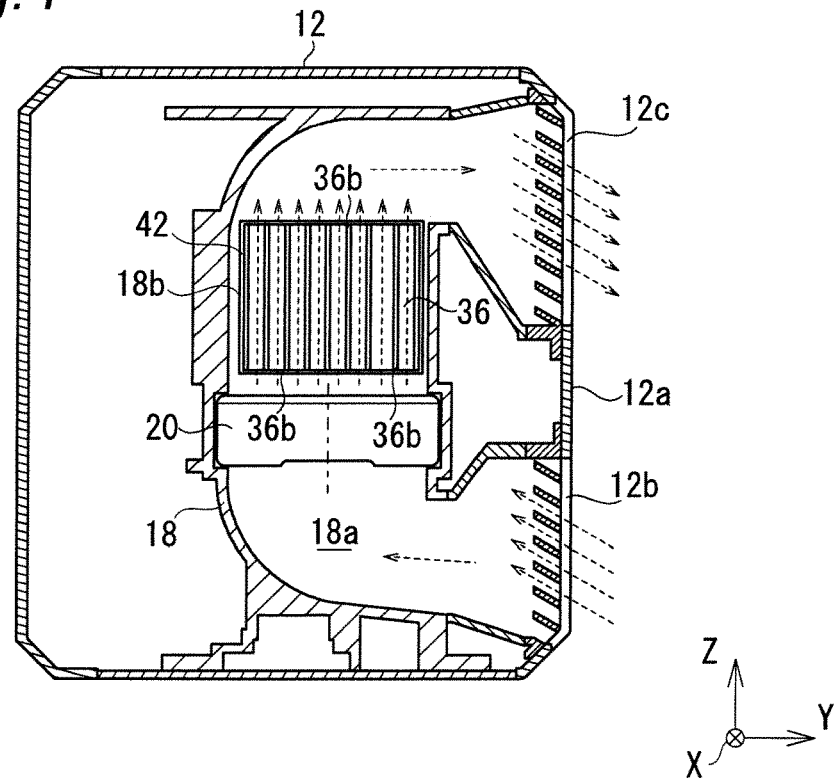
FIG. 4 is a cross-sectional view of an imaging apparatus showing a duct.

FIG. 4 is a cross-sectional view of the imaging apparatus showing a duct.

As shown in FIG. 4, the main frame 18 is arranged in the casing 12 and includes a duct 18a through which outside air (broken line arrow) flows. As shown in FIG. 1, the outside air flows into the duct 18a through the intake port 12b formed on the right side surface 12a of the casing 12. The outside air flowing into the duct 18a flows out to the outside of the casing 12 through the exhaust port 12c.

As shown in FIG. 4, a fan 20 is arranged in the duct 18a of the main frame 18. Rotation of the fan 20 causes the outside air to flow into the duct 18a through the intake port 12b, and the outside air in the duct 18a to flow out to the outside of the casing 12 through the exhaust port 12c.

As shown in FIGS. 3A and 3B, the main frame 18 supports the imaging unit 22 including the image sensor 14 and the lens attachment portion 16. Specifically, in the case of the present embodiment, the imaging apparatus 10 includes a front frame 24 that supports the imaging unit 22 and the lens attachment portion 16. Attachment of the front frame 24 to the main frame 18 causes the main frame 18 to support the image sensor 14 and the lens attachment portion 16.

In the case of the present embodiment, the front frame 24 includes a first subframe 26 and a second subframe 28 attached to each other.

The first subframe 26 is positioned in front of the second subframe 28. In addition, the first subframe 26 supports the lens attachment portion 16, and includes a through hole 26a through which light having transmitted through a lens (not shown) supported by the lens attachment portion 16 passes. The first subframe 26 is attached to the main frame 18. The second subframe 28 is positioned behind the first subframe 26. In addition, the second subframe 28 supports the imaging unit 22, and includes a through hole 28a through which light having passed through the through hole 26a of the first subframe 26 passes. The second subframe 28 is fixed to the first subframe 26.

Figure 5:
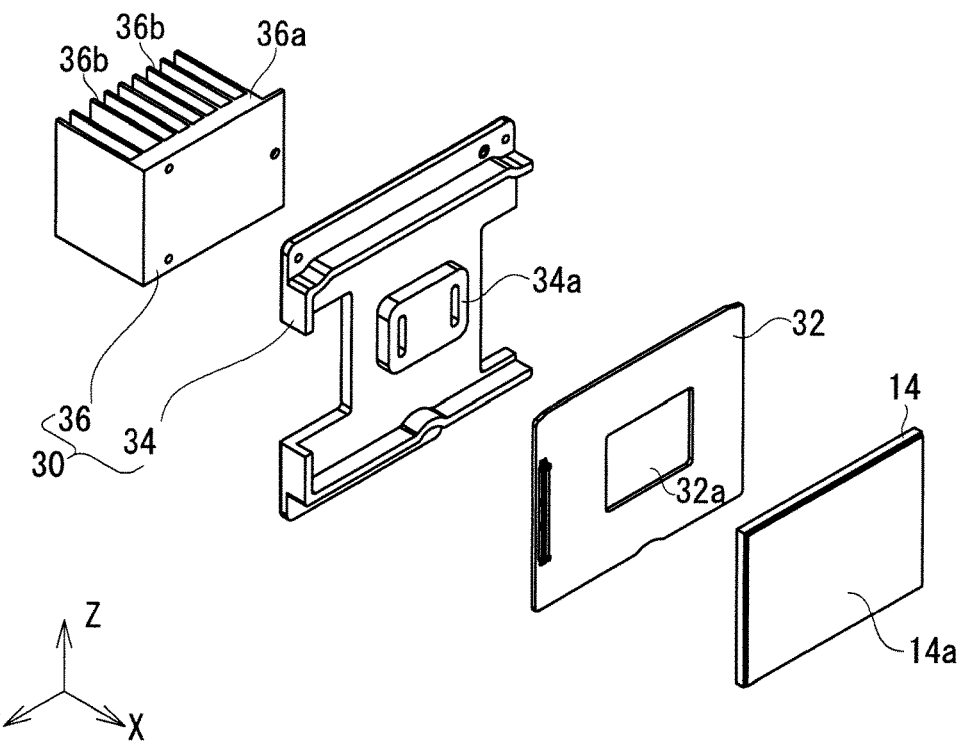
FIG. 5 is an exploded perspective view of an imaging unit.

FIG. 5 is an exploded perspective view of the imaging unit.

As shown in FIG. 5, the imaging unit 22 includes an image sensor 14 and a heat transfer member 30 that supports the image sensor 14 and absorbs heat. In the case of the present embodiment, the imaging unit 22 includes a board 32 on which the image sensor 14 is mounted. In addition, in the case of the present embodiment, the heat transfer member 30 includes a radiator plate 34 and a heat sink 36 attached to the radiator plate 34.

The board 32 is provided with a processing circuit and the like for processing a signal from the image sensor 14. The image sensor 14 is supported by the heat transfer member 30 by fixing the board 32 to the radiator plate 34 of the heat transfer member 30. In addition, the board 32 is formed with a through hole 32a. The through hole 32a allows a protruding portion 34a provided on the radiator plate 34 of the heat transfer member 30 to directly contact the image sensor 14. As a result, the radiator plate 34 can efficiently absorb heat of the image sensor 14 to cool the image sensor 14.

The heat sink 36 to be attached to the radiator plate 34 includes a base portion 36a to be attached to the radiator plate 34 and a plurality of fins 36b protruding in parallel with each other from the base portion 36a.

The heat sink 36 cools the radiator plate 34 that has absorbed heat from the image sensor 14. Specifically, although details will be described below, the plurality of fins 36b of the heat sink 36 are cooled by outside air flowing in the duct 18a of the main frame 18.

It should be noted that in the case of the present embodiment, the imaging unit 22 is supported by the front frame 24 (second subframe 28) via an adjustment mechanism that adjusts the inclination of the image sensor 14 with respect to the lens attachment portion 16.

Figure 6:
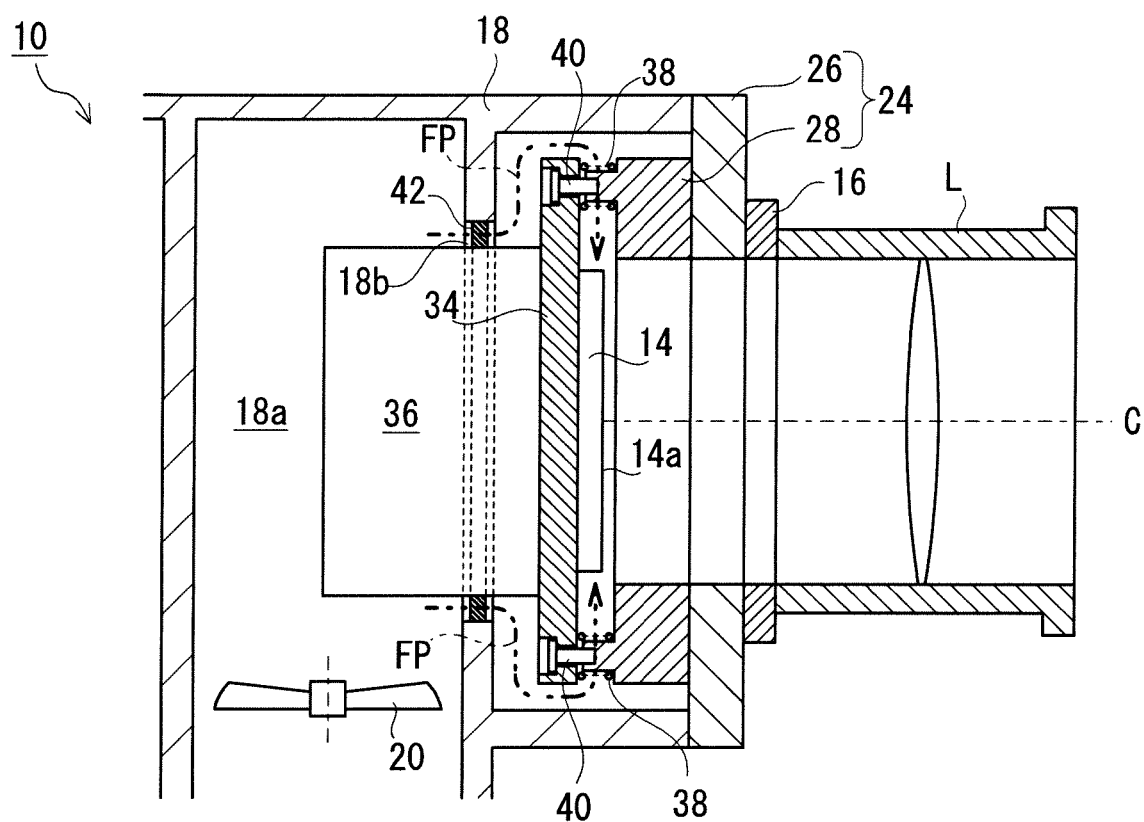
FIG. 6 is a schematic diagram of the subassembly shown in FIG. 2.

FIG. 6 is a schematic diagram of the subassembly shown in FIG. 2.

As shown in FIG. 6, the radiator plate 34 of the imaging unit 22 is supported by the second subframe 28 of the front frame 24 via a plurality of adjustment mechanisms including an adjustment spring 38 and an adjustment screw 40. In the case of the present embodiment, as shown in FIGS. 3A and 3B, three adjustment mechanisms (three adjustment springs 38 and three adjustment screws 40) are provided.

As shown in FIG. 6, the plurality of adjustment springs 38 are sandwiched and compressed between the second subframe 28 and the radiator plate 34. The adjustment screw 40 penetrates the radiator plate 34, passes through in the adjustment spring 38, and is screwed to the second subframe 28. Adjustment of the fastening amount of the plurality of adjustment screws 40 adjusts the inclination of the image sensor 14 supported by the radiator plate 34 with respect to the lens attachment portion 16. That is, the inclination of the light receiving surface 14a of the image sensor 14 with respect to the optical axis C of the lens L attached to the lens attachment portion 16 is adjusted. It should be noted that the radiator plate 34 is spaced apart from the main frame 18 so that the inclination of the radiator plate 34 (that is, the image sensor 14) can be adjusted. It should be noted that a space may be secured between the radiator plate 34 and the main frame 18 so that the adjustment screw 40 can be accessed even when the front frame 24 is attached to the main frame 18.

As described above, the plurality of fins 36b being a part of the heat sink 36 are cooled by the outside air flowing in the duct 18a of the main frame 18. To that end, as shown in FIGS. 3A, 3B, 4, and 6, the main frame 18 includes a through hole 18b that communicates the inside with the outside of the duct 18a. A part of the heat sink 36 passes through the through hole 18b, whereby the plurality of fins 36b are arranged in the duct 18a. In the case of the present embodiment, the plurality of fins 36b are arranged downstream from the fan 20 in the flow direction of the outside air in the duct 18a. Thus, the plurality of fins 36b of the heat sink 36 are cooled by the outside air flowing in the duct 18a. As a result, the image sensor 14 in contact with the radiator plate 34 to which the heat sink 36 is attached is cooled.

Outside air taken into the duct 18a from outside the casing 12 may include foreign matter such as dust. When such foreign matter such as dust adheres to the image sensor 14, particularly to the light receiving surface 14a thereof, the image quality of the captured image of the imaging apparatus 10 is deteriorated.

In the case of the present embodiment, as indicated by a thick broken line arrow in FIG. 6, a part of the outside air flowing through the duct 18a may pass through the gap between the heat sink 36 passing through the through hole 18b and the inner peripheral surface of the through hole 18b, pass between the radiator plate 34 and the main frame 18, pass between the radiator plate 34 and the second subframe 28, and reach the image sensor 14. When foreign matter such as dust is included in the flow FP from the duct 18a toward the image sensor 14, the foreign matter may adhere to the light receiving surface 14a of the image sensor 14.

On a flow path on which a flow FP of outside air from inside the duct 18a toward the image sensor 14 through the through hole 18b is generated, a seal member 42 that blocks the flow FP of outside air is provided.

Figure 7:
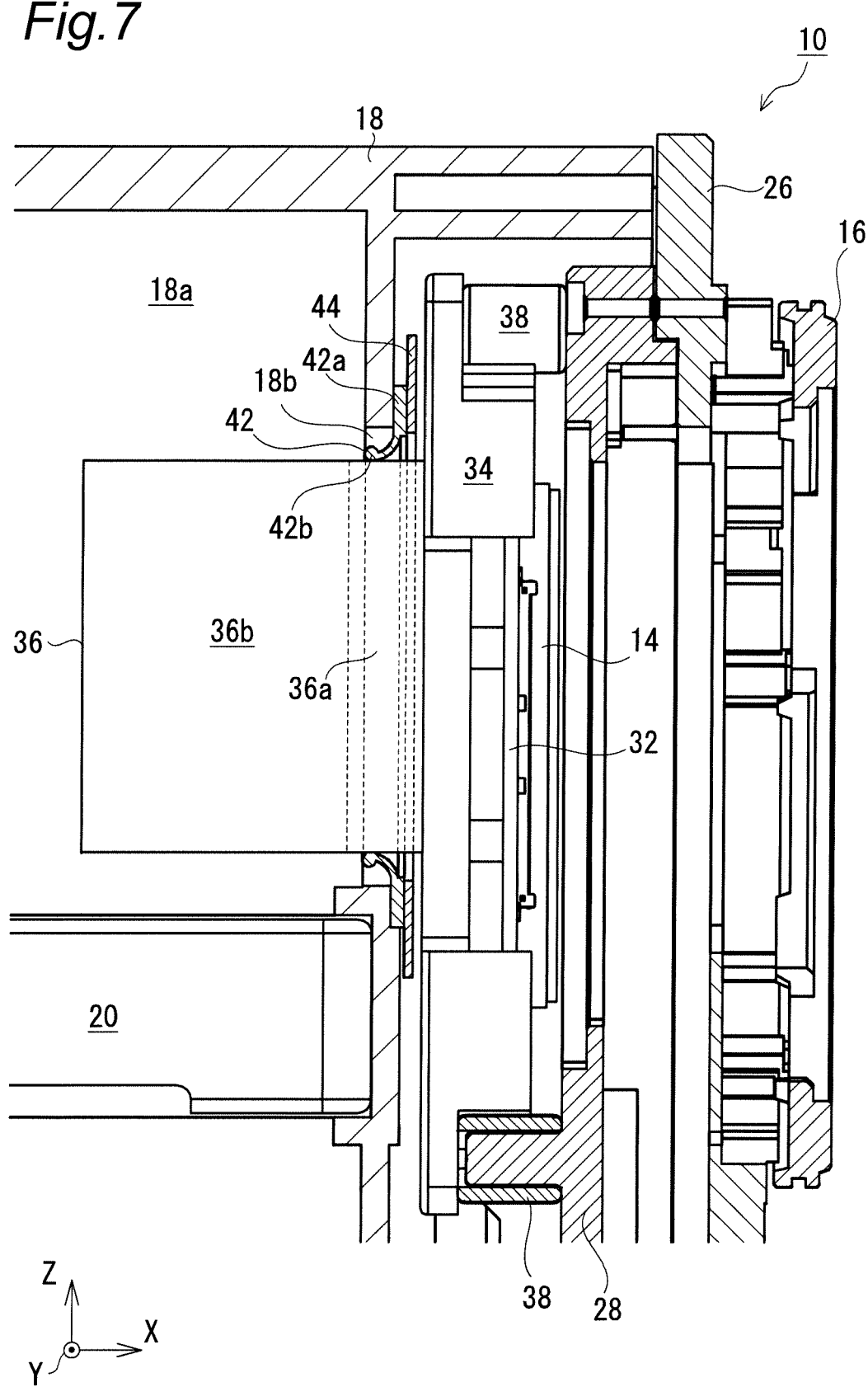
FIG. 7 is a cross-sectional view of a portion of the subassembly showing a seal member.

FIG. 7 is a cross-sectional view of a portion of the subassembly showing a seal member.

In the case of the present embodiment, the seal member 42 is made of an elastic material such as silicone rubber. In addition, as shown in FIGS. 3A, 3B, and 7, the seal member 42 includes an annular base portion 42a fixed to the opening edge portion of the through hole 18b outside the duct 18a, and a funnel-shaped seal portion 42b extending from the base portion 42a and entering the through hole 18b. The base portion 42a of the seal member 42 comes into contact with the opening edge portion of the through hole 18b to perform sealing, and the seal portion 42b of the seal member 42 comes into contact with the base portion 36a of the heat sink 36 over the entire peripheral direction to perform sealing.

It should be noted that as shown in FIG. 7, since the seal portion 42b of the seal member 42 extends from the base portion 42a positioned outside the duct 18a toward the inside of the through hole 18b, the heat sink 36 can easily pass from the outside to the inside of the duct 18a (unlike this, as compared with the case where the base portion 42a is in the duct 18a and the seal portion 42b extends from the inside to the outside of the duct 18a). As a result, the assembling performance of the imaging unit 22 to the main frame 18 is improved while obtaining the effect of shielding mixing of foreign matter.

According to this seal member 42, as shown in FIGS. 6 and 7, a gap between the heat sink 36 of the heat transfer member 30 passing through the through hole 18b of the main frame 18 and the inner peripheral surface of the through hole 18b is sealed. Thus, the flow FP of outside air from inside the duct 18a shown in FIG. 6 toward the image sensor 14 through the through hole 18b is blocked. As a result, adhesion of foreign matter such as dust to the image sensor 14 is suppressed.

It should be noted that in the case of the present embodiment, as shown in FIG. 7, the seal member 42 (the base portion 42a thereof) is fixed to the main frame 18 by being sandwiched between the annular seal presser plate 44 fixed to the main frame 18 and the main frame 18.

As described above, according to the present embodiment, in the imaging apparatus 10 that cools the image sensor 14 using the outside air, it is possible to prevent the foreign matter such as dust included in the outside air from reaching the image sensor 14.

Specifically, in the imaging apparatus 10 according to the present embodiment, the image sensor 14 and the heat transfer member 30 are not in direct contact with the main frame 18 including the duct 18a. Thus, no force is applied from the main frame 18 to the heat transfer member 30, and the positional relationship between the image sensor 14 supported by the heat transfer member 30 and the lens attachment portion 16 is appropriately maintained.

However, for this purpose, a part of the heat transfer member 30 (heat sink 36) needs to pass through the through hole 18b formed in the duct 18a. As a result, a gap is generated between the inner peripheral surface of the through hole 18b and the heat transfer member 30. Sealing this gap with the seal member 42 blocks the passage of foreign matter such as dust included in the outside air through the gap, and prevents the foreign matter from reaching the image sensor 14.

Although the embodiment of the present disclosure has been described above with reference to the above-described embodiment, the embodiment of the present disclosure is not limited to the above-described embodiment.

For example, in the case of the above-described embodiment, as shown in FIG. 5, the heat transfer member 30 that absorbs heat from the image sensor 14 includes the radiator plate 34 and the heat sink 36. However, the embodiment of the present disclosure is not limited thereto. The heat transfer member 30 may be configured by integrating the radiator plate 34 and the heat sink 36 as one component.

In addition, in the case of the above-described embodiment, as shown in FIGS. 3A and 3B, the seal member 42 is an annular elastic member.

However, the embodiment of the present invention is not limited thereto. As shown in FIGS. 6 and 7, the material and shape of the seal member are not limited as long as the gap between the heat sink 36 of the heat transfer member 30 and the inner peripheral surface of the through hole 18b can be closed. Furthermore, in the case of the above-described embodiment, as shown in FIG. 6, in order to block the flow FP of outside air from inside the duct 18a toward the image sensor 14 through the through hole 18b, the seal member 42 closes the gap between the heat sink 36 of the heat transfer member 30 and the inner peripheral surface of the through hole 18b. However, in the embodiment of the present disclosure, the arrangement position of the seal member is not limited thereto.

Figure 8:
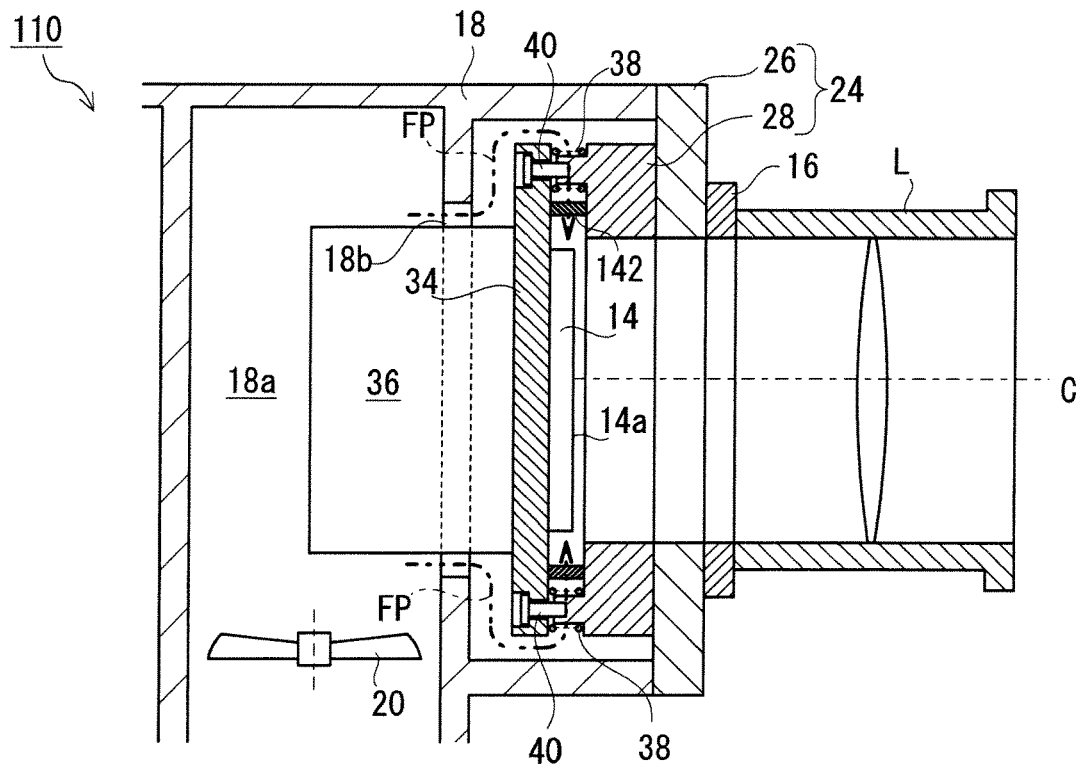
FIG. 8 is a schematic diagram of a subassembly in an imaging apparatus according to another embodiment.

FIG. 8 is a schematic diagram of a subassembly in an imaging apparatus according to another embodiment. In addition, FIG. 9 is a schematic diagram of a subassembly in an imaging apparatus according to a different embodiment.

In an imaging apparatus 110 according to the other embodiment shown in FIG. 8, a seal member 142 that blocks a flow FP of outside air from inside a duct 18a toward an image sensor 14 through a through hole 18b is an annular elastic member sandwiched between a radiator plate 34 and a front frame 24 (second subframe 28) to be compressed and deformed and surrounding the image sensor 14.

Figure 9:
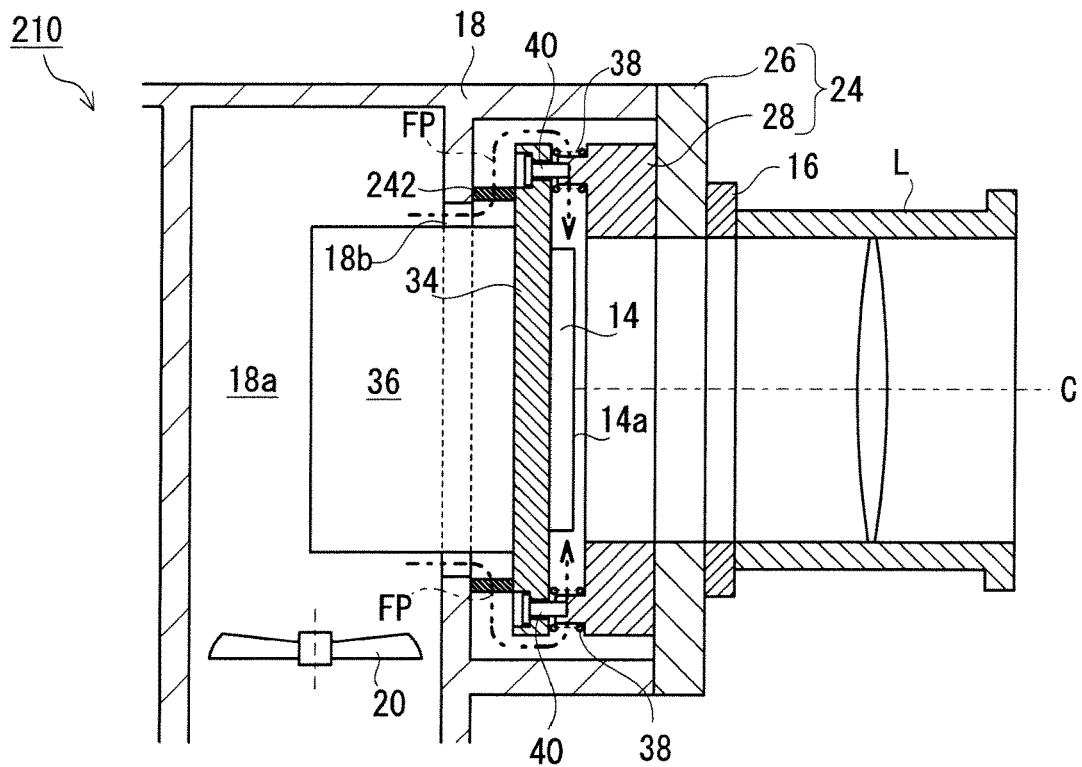
FIG. 9 is a schematic diagram of a subassembly in an imaging apparatus according to a different embodiment.

In an imaging apparatus 210 according to the different embodiment shown in FIG. 9, a seal member 242 that blocks a flow FP of outside air from inside a duct 18a toward an image sensor 14 through a through hole 18b is an annular elastic member sandwiched between a radiator plate 34 and a main frame 18 to be compressed and deformed and surrounding the through hole 18b.

That is, in a broad sense, an imaging apparatus according to an embodiment of the present disclosure includes: a lens attachment portion to which a lens is attached; an image sensor on which light transmitted through a lens attached to the lens attachment portion is incident; a heat transfer member configured to support the image sensor and to absorb heat of the image sensor; a main frame including a duct in which outside air flows and provided with a through hole through which a part of the heat transfer member passes; a fan arranged in the duct; a front frame configured to support the lens attachment portion and the heat transfer member and to be attached to the main frame; and a seal member configured to block a flow of outside air from inside the duct toward the image sensor through the through hole.

As described above, the above-described embodiment has been described as the exemplification of the technique in the present disclosure. To that end, drawings and a detailed description are provided. Therefore, among the components described in the drawings and the detailed description, not only the components essential for solving the problem, but also the components not essential for solving the problem may be included in order to exemplify the above technique. Therefore, it should not be recognized that these non-essential components are essential immediately because these non-essential components are described in the drawings and the detailed description.

In addition, since the above embodiment is for exemplifying the technique in the present disclosure, various changes, substitutions, additions, omissions, and the like can be made within the scope of the claims or the equivalent thereof.

The present disclosure is applicable to an imaging apparatus that cools an image sensor using outside air.

What is claimed is:

1. An imaging apparatus comprising:
    a lens attachment portion to which a lens is attached;
    an image sensor on which light transmitted through a lens attached to the lens attachment portion is incident;
    a heat transfer member configured to support the image sensor and to absorb heat of the image sensor;
    a main frame including a duct in which outside air flows and provided with a through hole through which a part of the heat transfer member passes;
    a fan arranged in the duct;
    a front frame configured to support the lens attachment portion and the heat transfer member and to be attached to the main frame; and
    a seal member configured to block a flow of outside air from inside the duct toward the image sensor through the through hole.

2. The imaging apparatus according to claim 1, wherein the seal member seals a gap between the heat transfer member passed through the through hole and an inner peripheral surface of the through hole.

3. The imaging apparatus according to claim 2, wherein the seal member is made of an elastic material, and includes an annular base portion fixed to an opening edge of the through hole outside the duct, and a funnel-shaped seal portion extending from the base portion and entering the through hole.

4. The imaging apparatus according to claim 1, wherein the heat transfer member includes:
    a radiator plate supporting the image sensor and arranged outside the duct, and
    a heat sink provided on the radiator plate, passing through the through hole of the duct, and partially exposed in the duct.

5. The imaging apparatus according to claim 1, wherein the heat transfer member is supported by the front frame via an adjustment mechanism configured to adjust inclination of the image sensor with respect to the lens attachment portion, and is spaced apart from the main frame.

* * * * *